Jan. 27, 1970 P. HIRSCH 3,492,629
DEVICE FOR JOINING CABLES
Filed Sept. 26, 1966 2 Sheets-Sheet 1

Jan. 27, 1970  P. HIRSCH  3,492,629
DEVICE FOR JOINING CABLES
Filed Sept. 26, 1966  2 Sheets-Sheet 2

3,492,629
DEVICE FOR JOINING CABLES
Paul Hirsch, 9 Heuberggasse, 1170 Vienna, Austria
Filed Sept. 26, 1966, Ser. No. 582,132
Claims priority, application Belgium, Oct. 8, 1965,
670,696
Int. Cl. H01r 7/08, 7/06, 11/20
U.S. Cl. 339—97                    18 Claims

ABSTRACT OF THE DISCLOSURE

A solderless device for joining insulated electric wires, cables and the like comprising at least one bolt part and at least one ring part axially mountable on the bolt part. The bolt part has a chamfered portion on at least one end to form a wedge surface. The ring part has a sharp edge on the side facing the bolt part which, due to the wedging action between the bolt part and ring part, will penetrate the insulation of the wire to effect electrical connection.

---

Figure 1:
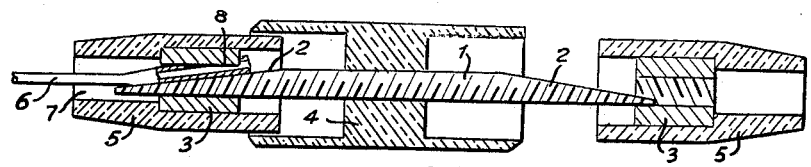

Devices for joining cables are known, for example cable connectors, plugs or the like, in which the cable is clamped in various ways. The oldest arrangement of this type is a clamp in which the clamping of the cable is effected by a clamping screw arranged transversely to the axis of the cable. Devices are also known in which the cable is clamped between a bolt and a ring which can be pressed axially on to the bolt. For example, a device is known in which a nut with a conical screwthread is screwed on to a bolt provided with a conical screwthread, the cable being inserted into a groove in the conical bolt and being clamped firmly by the screwing on of the conical nut. It is also known to press axially on to a conical or pyramidally chamfered bolt a correspondingly shaped ring, the cable being clamped between the bolt and the ring. In this connection it is also known to provide the bolt with ribs that enhance the clamping effect. Further, it is also known to screw a ring firmly axially against a conical bort and to clamp the cable between the ring and the cone. In all cases the end of the cable, as has always been customary hitherto, be freed from insulation and bared in order to provide a good contact surface.

The invention relates to a device for the joining of electrical cables, the device comprising at least one bolt part and at least one ring part which can be pressed axially on to the bolt part, and in accordance with the invention the bolt part is chamfered at at least one end to form a wedge surface and the ring part has a sharp edge at the end facing the bolt part and consists of electrically conducting material. With this construction there is the advantage that a cable covered with an insulating sheath can be clamped without removal of the insulation to form an electrically conducting connection. The sharp edge cuts into the insulating sheath and makes the electrical contact by engaging with the metallic cores of the cable. Since the bolt part is chamfered to form a wedge surface, the cable is brought into the vicinity of the sharp edge. The bolt part and the ring part are rotatable relatively to one another so that the sharp edge makes an elongate cut, and in accordance with a preferred practical form of the invention the bolt part has an axially extending groove-like recess the base of which extends obliquely to the axis of the bolt and forms the wedge surface, so that the cable is prevented from rotating on the bolt when the ring part is being screwed on. The construction of the bolt part with an axially extending recess, the base of which forms the wedge surface, has the further advantage that the peripheral portion of the bolt part, which is formed with a screwthread, is enlarged in the vicinity of this wedge surface. Preferably the bolt part is a screwthreaded bolt and the ring part is a screwthreaded nut which in the region of the sharp edge preferably has a zone without screwthread, so as to enable a smooth cut to be made.

In an advantageous practical form of the invention an internal cone adjoins the sharp annular edge of the ring part at its largest diameter, i.e. the ring part is chamfered so as to taper conically inwardly away from the sharp edge. The cable, which abuts the wedge surface of the bolt part, is located obliquely to the axis of the ring part when in clamped position. Owing to the internal cone adjoining the sharp edge of the ring part the advantage is obtained, that the cut by which the insulation is separated is diverted in the direction of the cable axis and hence displacement of the core of the cable is resisted. A further advantage obtained is that the contact-forming abutment of the contact surface is no longer limited to the sharply cut edge, but the internal cone abuts at least partly against the metallic conductor, so that the contact resistance is reduced. The arrangement is preferably such that the produced ends of the internal cone are substantially parallel to the wedge surface of the bolt. Preferably the angle of inclination of the wedge surface of the bolt part to the axis of the bolt part and ring part is between 15 and 35°, and in particular between 20 and 30°. Desirably, therefore, the half apex angle of the internal cone which adjoins the sharp annular edge of the ring part is from 15 to 35° and preferably 20 to 30°. Preferably the angle of the wedge formed by the base of the groove-like recess in the bolt part increases progressively towards the run-out end of the recess, the produced ends of the internal cone extending substantially parallel to the steeper part of the wedge surface of the base of the recess. Owing to this progressive increase in the wedge angle at the run-out end of the groove the cable is raised somewhat and firm clamping is achieved, since a pull on the cable has the effect of increasing the pressure of application of the internal cone adjoining the sharp edge..

Preferably the ring part is chamfered externally in the region of its sharp annular edge, and has for example an external conical surface adjoining the sharp annular edge, the ring part being freely located in the region of this chamfering. This has the advantage that in spite of the transition of the sharp edge at the inner side into the internal cone an apex angle of not more than 90° is retained at the sharp edge, which ensures the cutting action.

Owing to the internal cone adjoining the sharp edge, damage of the metallic core of the cable by the sharp edge is prevented. In order to ensure the avoidance of damaging of the metallic core or cutting thereof, the materials selected may be such that the material of the ring part in the region of the sharp edge is no harder than the wire but is harder than the insulation of the cable. In this way the insulation is cut through smoothly but the metallic conductor is not affected, so that a still better conduct is provided between the ring part and the metallic core of the cable and hence the contact resistance is lower.

The device according to the invention may be made in the form of a cable connector, in which case the arrangement is preferably such that the bolt part is chamfered in edge form at both ends and ring parts can be pressed on to both ends of the bolt part. However, the device according to the invention may also serve to connect a cable to another electrically conducting part, for example a banana plug or the like, in which case the bolt part itself may form the plug or the like.

Figure 2:
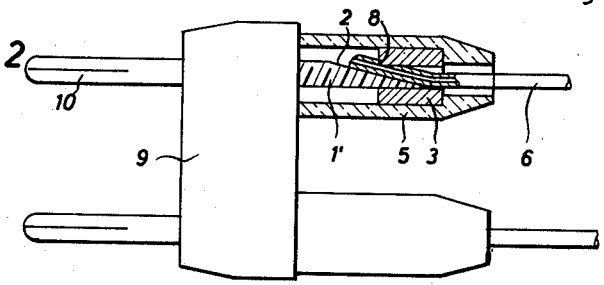
Figure 3:
Figure 4:
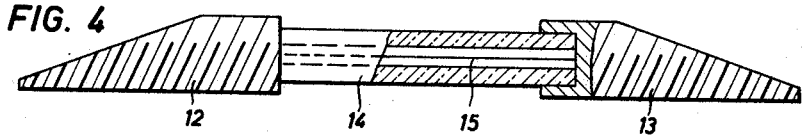
Figure 5:
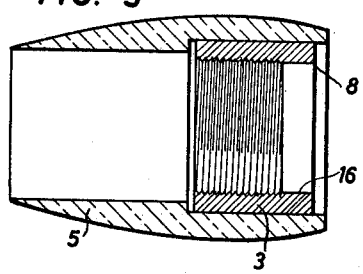
Figure 6:
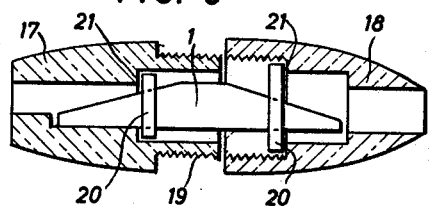
Figure 7:
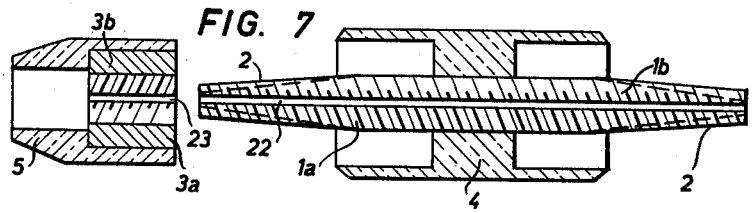
Figure 8:
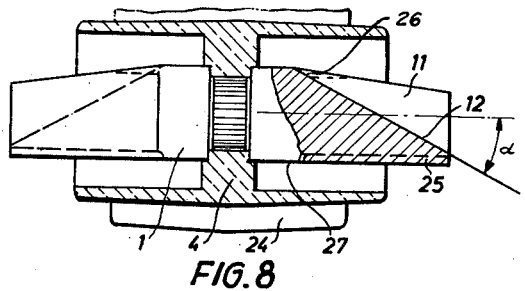
Figure 10:
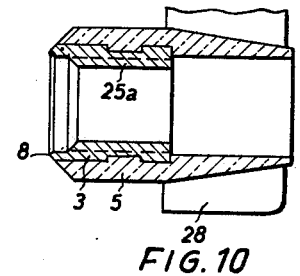
Figure 9:
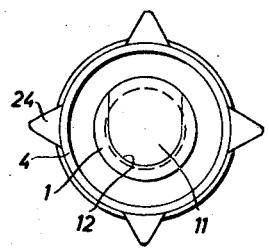
Figure 11:
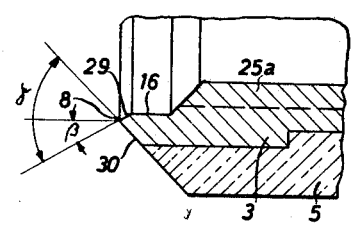
Figure 12:
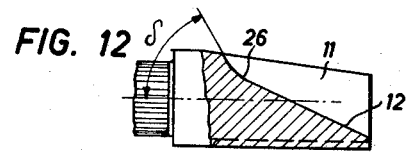
Figure 13:
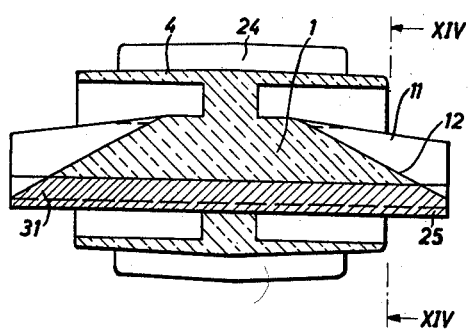
Figure 14:
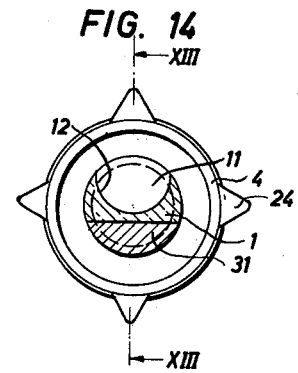

Embodiments of the invention will now be described by way of example with reference to the accompanying drawings, in which:

FIG. 1 shows a cable connector,
FIG. 2 shows the connection of cables to a plug, FIG. 3 shows a particular construction of the bolt part, FIG. 4 shows the bolt part constructed as a safety fuse, FIG. 5 shows a particular construction of the ring part, FIG. 6 shows another embodiment of cable connector, FIG. 7 shows a cable connector for two pins, FIGS. 8, 9 and 10 show a particularly advantageous construction of cable clamp, FIG. 8 being an axial section through the bolt part, FIG. 9 an end view of the bolt part and FIG. 10 showing a ring part, partly in section, FIG. 11 shows a detail of FIG. 10, FIG. 12 shows a modification of FIG. 8, and FIGS. 13 and 14 show a modified construction of the bolt part of a cable clamp, FIG. 13 being an axial section on the line XIII—XIII of FIG. 14 and FIG. 14 being a radial section on the line XIV—XIV of FIG. 13.

In the embodiment shown in FIG. 1, reference numeral 1 indicates the bolt part which is in the form of a screw-threaded bolt. This bolt part is chamfered at both ends so that wedge surfaces 2 are formed. Reference numeral 3 indicates the ring parts which are in the form of screw-threaded nuts. The bolt part 1 is enclosed by a sleeve 4 and the ring parts 3 are enclosed by sleeves 5. The sleeves 4 and 5 consist of insulating material, for example a plastics material. The bolt part 1 is firmly fixed against rotation in the sleeve 4 and the ring parts 3 are fixed against rotation in the sleeves 5.

The cable 6 is inserted into the opening 7 in the sleeve 5 and extends as far as the wedge surface 2. The inner edge 8 of the ring part 3 facing the bolt part 1 is sharp, and when the sleeve 5 is screwed firmly to the ring part 3 the edge 8 cuts into the insulating sheath of the cable 6 until it comes into electrically conducting contact with the metallic conductor of the cable 6. In this way the electrically conducting connection between the cables to be connected is established via the ring part 3 and the bolt part 1, and the ends of the cables are clamped in such manner that they can be separated only with difficulty even by pulling on them.

FIG. 2 shows a device according to the invention on a two-pin plug 9. In principle, this arrangement differs from the arrangement shown in FIG. 1 only in that the bolt part 1 has a wedge surface 2 at only one end, whilst the other end forms the plug pin 10. The sleeve 4 is now replaced by the body of the plug 9, and the sleeve 5 is extended. A banana plug which has only one pin 10 can be constructed in the same manner.

In the embodiment shown in FIG. 3 the bolt part is formed with an axially extending groove-like recess 11 the base 12 of which is inclined to the axis of the bolt part 1 and constitutes the wedge surface. The cable lies in this groove-like recess 11 in the same manner as on the wedge surface 2 in the embodiment shown in FIG. 1. As shown in the drawing, the screwthread at the end of the bolt part extends over an appreciably larger part of the periphery than in the embodiments shown in FIGS. 1 and 2, so that the nut formed by the ring part 3 becomes seated on the end of the bolt part 1 after only a few turns.

FIG. 4 shows an embodiment in which the bolt part 1 is subdivided into two ends 13 and 13a of electrically conducting material which are interconnected by a tubular part 14 of electrically insulating material, for example glass. In this tubular part is arranged a fusible wire 15, so that the cable connector, which may be constructed as in FIG. 1, acts as an intermediate safety device.

FIG. 5 shows a ring part 3 with a sleeve 5. The ring part 3 is formed as a nut, but in the region of the edge 8 its bore has a smooth zone 16 so that the edge 8 may be formed as a sharp cutter.

The embodiment shown in FIG. 6 differs from that shown in FIG. 1 in that the bolt part 1 is of smooth form and tightening is effected by providing the insulating sleeves 17 and 18 with screwthreads 19. The ring parts 20 also have smooth bores and are supported against shoulders 21 on the sleeves 17 and 18, so that when the two sleeves 17 and 18 are screwed together they are tightened on to the bolt part 1, and their cutting edges 8 engage the cable and cut through the insulating sheath.

FIG. 7 shows an embodiment in which the bolt part 1 is divided in the axial direction into halves 1a and 1b, which are separated by an insulating layer 22. The two halves have, in this case, wedge surfaces 2 to which the wires to be connected are applied, and the ring parts in the form of nuts are likewise divided by an insulating intermediate layer 23 into two parts 3a and 3b. Care must be taken to see that the two insulating parts 22 and 23 are in register so that the two halves 1a and 1b of the bolt part remain insulated from one another. This can be achieved by screwing the ring part 3b up to a stop that ensures the correct angular position, or the bolt part 1a, 1b may have a cross-section other than circular, and the bore of the ring part 3b may be non-circular in which case the ring part 3b will, of course, not be rotatable. In this manner cable connections having two poles can be formed.

FIGS. 8 to 11 show a preferred practical form of cable clamp. In FIG. 8, reference numeral 1 again indicates the metallic bolt part, which is moulded into a sleeve 4 of plastics material. Wings 24 enable this part to be held firmly in position. The bolt part 1 also has at both ends a groove-like recess 11 the base 12 of which forms a wedge surface. This wedge surface forms with the axis of the bolt part 1 an angle α, which is between 15° and 35°, preferably between 20° and 30°. The bolt part has a screwthread 25 which does not extend over the whole length of the bolt part. In the region of the run-out end 26 of the groove-like recess 11 is provided a non-screwthreaded zone 27. On to the two ends of the bolt part 1 are screwed ring parts 3 (FIG. 10), which have an internal screwthread 25a. The metallic ring parts 3, which are provided with sharp annular edges 8, are moulded in plastic sleeves 5 which again have wings 28 for engagement.

The sharp annular edge is adjoined, as is illustrated on a larger scale in FIG. 11, by an internal cone 29, the larger diameter of the internal cone corresponding to the daimeter of the sharp annular edge 8. Adjoining this internal cone 29 is provided a non-screwthreaded zone 16. Externally the ring part 3 is chamfered in such manner that an external cone 30 adjoins the sharp edge 8. In the region of the external cone 30 the metallic ring part is free and is not covered by the plastics sleeve 5.

β Is the half apex angle of the internal cone 29, and corresponds approximately to the angle of inclination α of the wedge surface that forms the base of the recess 11. The angle of inclination of the external cone 30 is such that at the sharp edge 8 there is an apex angle δ, which is somewhat smaller than 90° so that a cutting action is exerted on the insulation.

The cable is inserted into the groove-like recess 11 and the ring part 3 is firmly screw on to the bolt part 1. During this operation the sharp edge 8 cuts through the insulation and the internal cone 29 comes into engagement with the metallic core of the cable.

In the case of the modification shown in FIG. 12 the inclination of the wedge surface 12, which forms the base of the recess 11, varies progressively and becomes steeper at the run-out 26. At this point the angle of inclination of the base 12 of the recess is indicated by δ and in this case the arrangement is preferably such that the angle β of the internal cone corresponds approximately to this angle δ.

In the embodiment of the bolt part shown in FIGS. 13 and 14 the metallic portion of the bolt part is limited to a circular cylindrical segment 31. The remaining part of the bolt part 1 consists of plastics material and is formed in one piece with the sleeve 4. In this manner cheaper manufacture is possible, the circular cylindrical segment 31 having a pressed screwthread 25 being merely laid in a mould and having plastics material moulded around it in the manner illustrated. Here also the bolt part is formed at both ends with a groove-like recess 11, the wedge surface 12 that forms the base of the recess again being indicated by 12.

What I claim is:

1. A device for joining insulated electric wires comprising at least one bolt part and at least one ring part which can be axially mounted onto said bolt part, said bolt part being chamfered at least at one end to form a wedge surface and said ring having an annular sharp edge on the side facing said bolt part and serving to penetrate the insulation of the wire, first insulating sleeve means having said at least one bolt part nonrotatably mounted therein, and at least one second insulating sleeve means each having one of said at least one ring part nonrotatably mounted therein and being received in said first insulating sleeve.

2. A device according to claim 1, wherein the bolt part and the ring part are rotatable relative to one another to be screwed together.

3. A device according to claim 1, wherein the bolt part has an axially extending groove-like recess the base of which is inclined to the axis of the bolt part and forms the wedge surface.

4. A device according to claim 1, wherein the bolt part is formed as a screwthreaded bolt and the ring part is formed as a nut which in the region of the sharp edge preferably has a non-screwthreaded zone.

5. A device according to claim 1, wherein the ring part is externally chamfered in the region of its sharp annular edge, having an external conical surface adjoining the sharp annular edge, and is free in the region of this chamfering.

6. A device according to claim 1, wherein said ring part in the region of the sharp edge is no harder than the wire, but is harder than the insulation of the cable.

7. A device according to claim 1, wherein the distance of the sharp edge from the wedge surface in a central region thereof corresponds approximately to half the diameter of the insulated wire for which the device is intended.

8. A device according to claim 1 wherein the bolt part is formed with a screwthread and has a non-screwthreaded zone in the region of the run-out of the groove-like recess.

9. A device according to claim 1, wherein the bolt part has wedge surfaces at both ends and ring parts can be pressed on to both ends of the bolt part.

10. A device according to claim 1, wherein the bolt part is formed as at least part of a plug.

11. A device according to claim 1, wherein the ends of the bolt part consist of electrically conducting material and are connected mechanically by an electrically insulating part and also electrically by a fusible wire.

12. A device according to claim 1, wherein the bolt part is subdivided into two halves which are separated from one another by an insulating layer, both halves being chamfered at their ends.

13. A device according to claim 1, wherein the sharp annular edge is adjoined by an internal cone at the largest diameter thereof.

14. A device according to claim 13, further comprising projections on the internal cone approximately parallel to the wedge surface of the bolt.

15. A device according to claim 13, wherein the half apex angle of the internal cone is 15–35°, preferably 20–30°.

16. A device according to claim 13, wherein the wedge angle of the base of the groove-like recess in the bolt part increases progressively towards the end of the recess and projections on the internal cone extending approximately parallel to the steeper part of the wedge surface of the base of the recess.

17. A device according to claim 1, wherein the ring part is formed without a screwthread and is accommodated in a sleeve of electrically insulating material which can be screwed to a sleeve of electrically insulating material surrounding the bolt part.

18. A device according to claim 17, wherein the bolt part with the sleeve surrounding it and engageable over the ring part consists of plastics material in which is embedded a circular cylindrical segment forming a part of the bolt part facing away from the recess.

References Cited

UNITED STATES PATENTS

| | | | |
|---|---|---|---|
| 242,388 | 5/1881 | Smith | 339—268 X |
| 1,650,064 | 11/1927 | Dennis | 339—268 X |
| 1,928,157 | 9/1933 | Levin | 339—95 X |
| 2,076,072 | 4/1937 | Douglas | 339—206 X |
| 2,418,164 | 4/1947 | Corley | 339—268 |
| 2,755,451 | 7/1956 | Smyers | 339—268 X |
| 2,785,319 | 3/1957 | Simpson et al. | |
| 2,801,396 | 7/1957 | Stegeman | 339—97 |
| 2,908,884 | 10/1959 | Wirsching | 339—274 X |
| 2,911,611 | 11/1959 | Miller | 339—274 X |
| 3,309,645 | 3/1967 | Noschese | 339—98 |

FOREIGN PATENTS

| | | |
|---|---|---|
| 556,844 | 4/1923 | France. |
| 908,449 | 9/1945 | France. |
| 142,175 | 4/1920 | Great Britain. |
| 262,968 | 12/1926 | Great Britain. |
| 1,024,525 | 3/1966 | Great Britain. |
| 104,417 | 4/1924 | Switzerland. |

MARVIN A. CHAMPION, Primary Examiner

J. H. McGLYNN, Assistant Examiner

U.S. Cl. X.R.

339—268, 273